BRINING

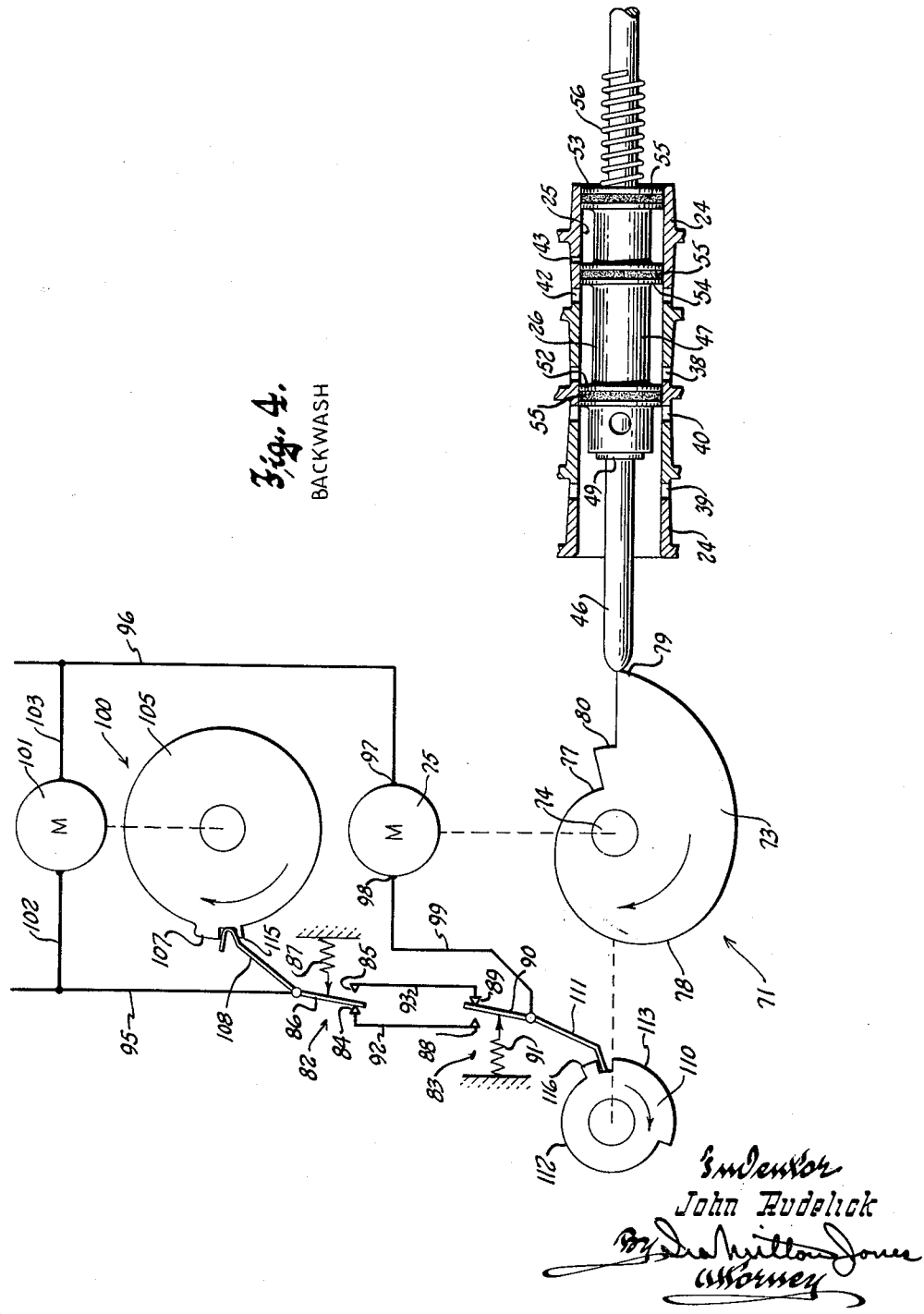

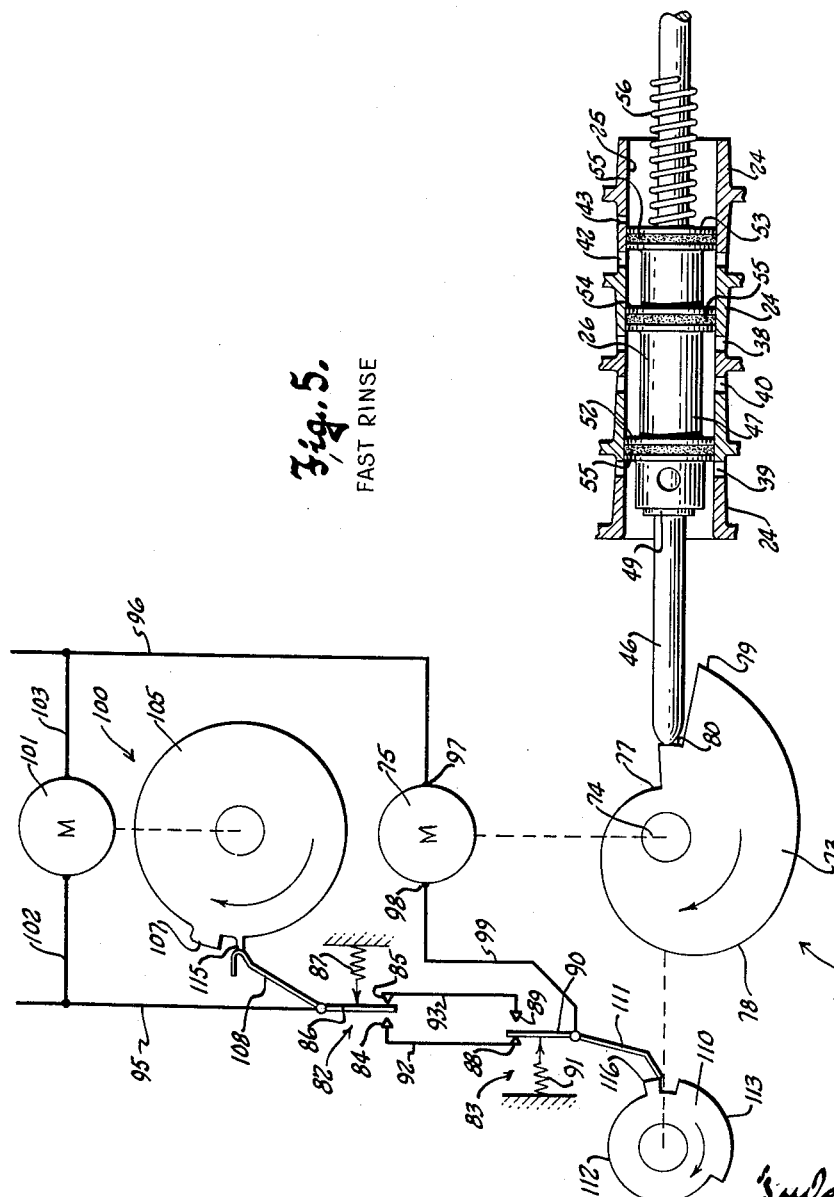

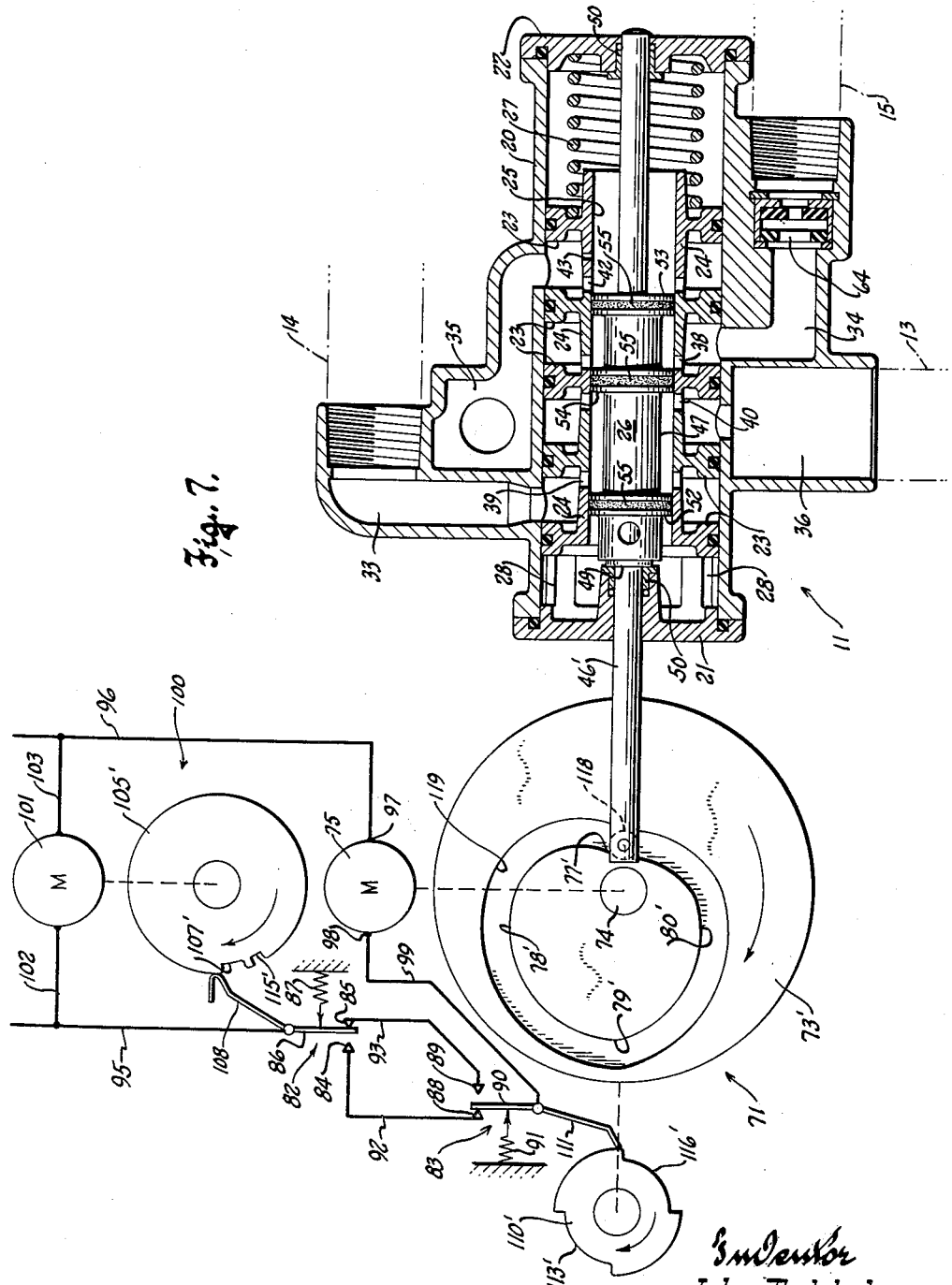

United States Patent Office 3,073,346
Patented Jan. 15, 1963

3,073,346
AUTOMATIC WATER SOFTENING APPARATUS AND DISTRIBUTOR VALVE THEREFOR
John Rudelick, Milwaukee, Wis., assignor to Bruner Corporation, Milwaukee, Wis., a corporation of Wisconsin
Filed Jan. 3, 1961, Ser. No. 80,294
1 Claim. (Cl. 137—624.13)

This invention relates to water softening apparatus which is especially, though not exclusively, suited for residential use, and has more particular reference to improvements in distributor valves for such apparatus, by which service as well as regenerating operations thereof are controlled entirely automatically.

The distributor valve to which this invention pertains is similar in some respects to that disclosed in Patent No. 2,920,652, issued to John Rudelick et al. on January 1, 1960, and also to that of my copending application Serial Number 722,093, filed March 17, 1958, now Patent No. 2,989,988. However, where the distributor valves of said patent and copending application are of the semi-automatic type requiring manual actuation by an attendant at least to effect initiation of a regenerating cycle of the apparatus controlled thereby, it is a general purpose of this invention to provide an improved distributor valve which may be operated entirely automatically and, moreover, which effects periodic regeneration of a water softener controlled thereby in a much more efficient and satisfactory manner than was heretofore possible.

More specifically, it is the purpose of this invention to provide a distributor valve, for governing the service and regenerating operations of water softening apparatus, along with an operator for the valve to actuate the same entirely automatically and thus assure that a plurality of regenerating operations will always be carried out in a predetermined sequence for the most efficient regeneration of the apparatus. This, of course, is in distinction to past control valves of the semi-automatic variety requiring manual actuation at least once, and sometimes twice, to effect regeneration of a water softening apparatus controlled thereby, and which, therefore, could be improperly operated or otherwise inadvertently misused to unintentionally circumvent the intended regenerating procedure.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate two complete examples of the physical embodiments of the invent on constructed according to the best modes so far devised for the practical application of the principles thereof, and in which:

FIGURE 4 is a diagrammatic view similar of FIGURE 3, but illustrating the control element of the valve shifted to a second regenerating position;

FIGURE 5 is a diagrammatic view similar to FIGURE 4, but illustrating the control element of the valve shifted to a third regenerating position;

FIGURE 6 is a detail sectional view taken through FIGURE 2 on the plane of the line 6—6; and FIGURE 7 is a view similar to FIGURE 2, but illustrating a slightly modified form of operator for the control element of the valve.

Figure 1:
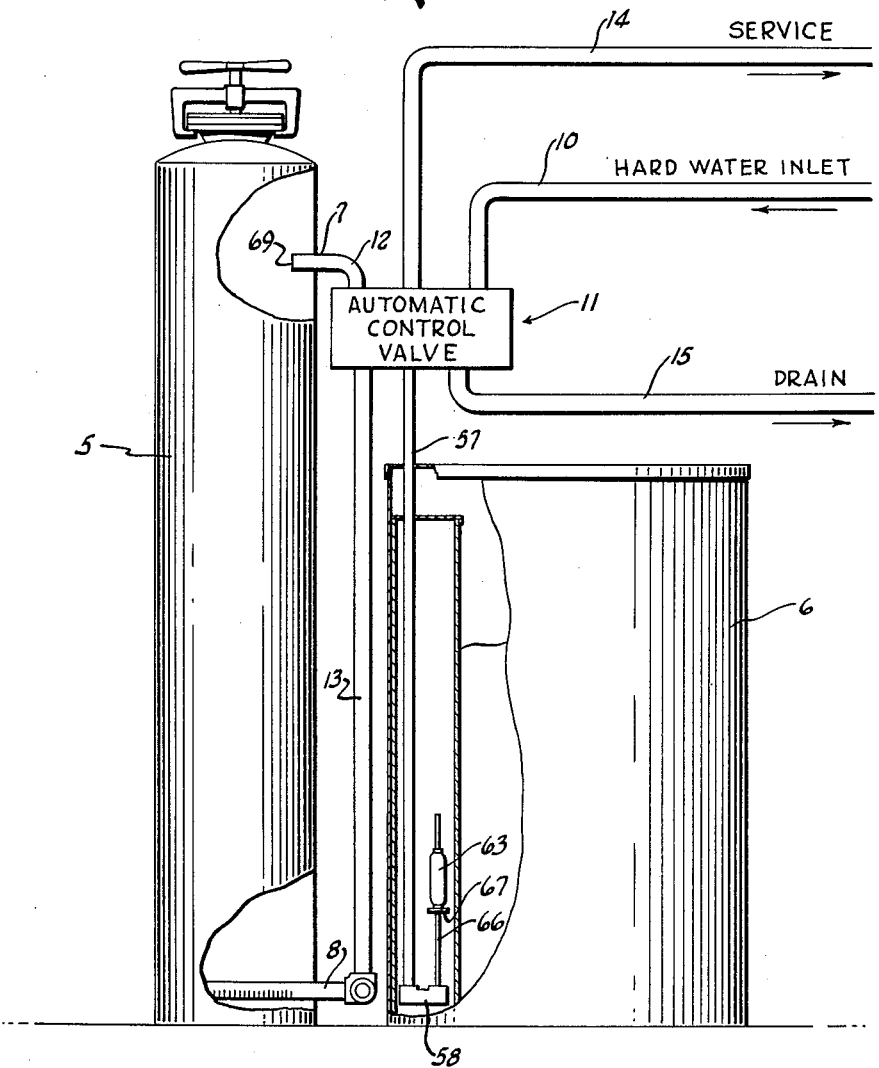
FIGURE 1 is a more or less diagrammatic elevational view of automatically controlled softening apparatus embodying this invention.

Referring now to the accompanying drawings, in which like reference characters have been applied to like parts throughout the views, and particularly to FIGURE 1, the numeral 5 generally designates a water softener tank containing a bed of ion exchange material (not shown) which is preferably comprised of small granules or beads of synthetic resin such as now commonly employed for water softening purposes. The numeral 6 generally designates a brine tank of a more or less conventional type, in which brine is generated and stored for use during regeneration of the ion exchange material in the softener tank.

In normal or service operation, hard water from a source thereof under pressure is run into the tank 5 and through the bed of ion exchange granules therein to be softened by contact therewith. For this purpose, the tank 5 is provided with top and bottom flow ports 7 and 8, respectively. In the present case, water to be softened enters the top flow port 7 for downflow passage through the softener tank, and it issues from the bottom port 8 softened water.

A hard water supply line 10 connecting with the source of water to be softened delivers hard water to the control or distributor valve 11 of this invention, and the valve normally directs such water into a duct 12 which connects with the top flow port 7 of the softener tank. Soft water discharges from the bottom of the tank into a duct 13 leading back to the control valve, and the valve normally directs such softened water into a service line 14.

As will be explained at greater length hereinafter, the control valve 11 automatically initiates regeneration of the ion exchange material contained in the water softener tank, and the valve functions to automatically carry the system through a regenerating cycle comprised of the successive steps of brining, backwashing, and rinsing before the valve restores the system to service operation. Brining is effected by flowing brine downwardly through the tank, the brine effluent issuing from the bottom thereof being carried via duct 13 back to the valve which directs the effluent into a drain line 15. During backwashing, which follows brining as the second regenerating step of the cycle, the control valve directs hard water from line 10 into the bottom flow port 8 of the water softener tank, and communicates the top flow port 7 of the tank with the drain line 15.

After a predetermined period of backwashing, the automatic control valve may function either to return the softener to service condition, or optionally, it may effect a short period of rinsing during which it directs source water into the top flow port 7 for downflow passage therethrough, and routes the rinse effluent to the drain line 15. However, if the short final rinse is omitted, the full benefits of the very simple control system hereinafter described cannot be obtained.

Figure 2:
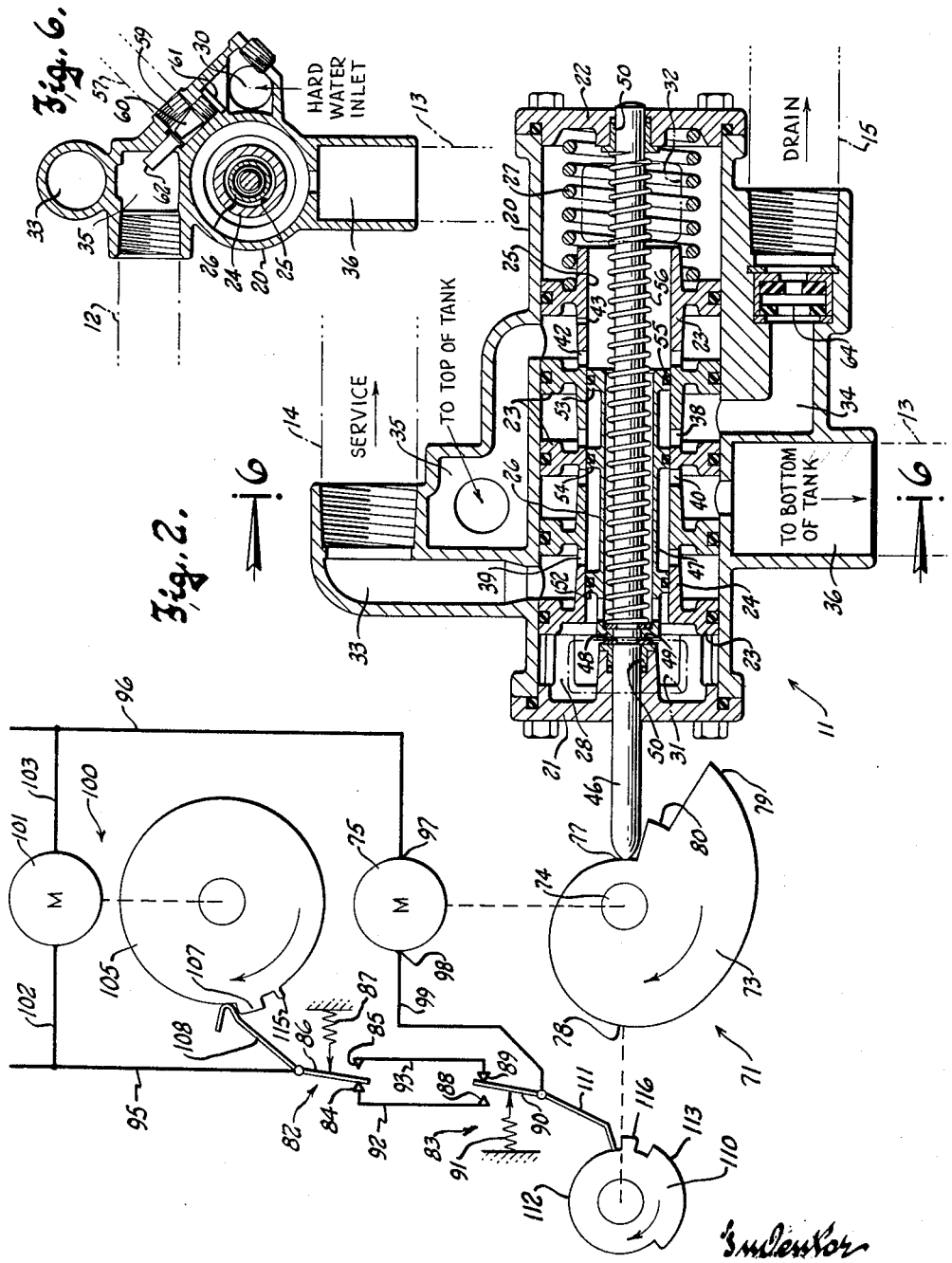
FIGURE 2 is an enlarged longitudinal sectional view through the distributor valve of the apparatus, diagrammatically illustrating the means for automatically shifting the movable control element of the valve, but showing the same in its normal or service position.

As seen best in FIGURE 2, the control valve 11 comprises an elongated substantially tubular body 20 closed at its ends by detachable front and rear covers 21 and 22, respectively. A number of glands 23 in the body have coaxial endwise abutting hubs 24 which collectively define a bore 25 in which a control spool 26 is axially slidably received. The assembly of glands is held in a predetermined position within the body of the valve, spaced from both covers thereof, as by a strong compression spring 27 confined between the rear cover 22 and the rearmost gland, and a plurality of circumferentially spaced fingers 28 on the inside of the front cover and against which the foremost gland abuts.

The glands 23 have sealing engagement with the inner wall surface of the tubular body 20, and their arrangement generally follows the construction disclosed in the aforesaid Patent No. 2,920,652, to which reference may be had for a more complete description of the manner in which notches in the abutting ends of the hubs on the glands form the porting of the valve.

The body 20 of the valve is provided with external enlargements one of which defines an inlet passage 30 which extends all along one side of the body and opens to one end thereof for connection with the supply line 10. The passage 30 opens into the tubular body portion of the valve, adjacent to the opposite ends of the gland assembly through front and rear water inlet ports 31 and 32, respectively, shown in construction lines in FIGURE 2. Hence, source water may enter the bore 25 from either end thereof.

A service passage 33 formed in another of the enlargements on the exterior of the body, opens to the exterior thereof for connection with the service line 14. Similarly, a drain passage 34 in another enlargement opens to the exterior of the body for connection with the drain line 15; and first and second tank passages 35 and 36, respectively, open to the exterior of the body for connection with the ducts 12 and 13, respectively.

The passage 34 communicates with a drain port 38 through the hub of one of the glands and which opens into the bore 25 substantially medially between its ends; the passage 33 opens into the bore through a service port 39 in the hub of the foremost gland, at a location near the forward end of the bore; the second tank passage 36 communicates with a port 40 which opens into the bore 25 at a location axially intermediate the ports 38 and 39; and the first tank passage 35 communicates with the bore through two ports, namely, a main port 42 and an auxiliary port 43. The main and auxiliary ports 42 and 43, respectively, are spaced axially from one another along the bore, and the auxiliary port is close to the rear end of the bore so that the main port 42 may be said to be located axially intermediate the auxiliary port 43 and the drain port 38.

The control spool 26 controls communication between the various ports and the passages with which they communicate. It comprises a stem 46 and an elongated cylindrical enlargement 47 coaxial with the stem and fixed thereto so as to slide axially back and forth with the stem. In the present case, the connection between the cylindrical enlargement and the stem comprises an inwardly directed flange 48 at the forward end of the cylinder, confined between a pair of snap rings 49 engaged in grooves in the stem.

The stem 46 is guided for axial motion in suitable centrally disposed bearings 50 in the end covers and there are three axially spaced circumferential lands on the exterior of the cylinder 47, namely, remotely spaced front and rear lands 52 and 53, respectively, and an intermediate land 54. These lands have O-rings 55 confined in outwardly opening circumferential grooves in their peripheries, to have sealing engagement with the wall of the bore 25 and thus prevent leakage of liquid past the lands.

A compression spring 56 encircling the stem 46 and extending forwardly into the cylinder 47 is confined between the inwardly directed flange 48 at its anchored end and the rear cover 22 to exert a forward force upon the control spool to yieldingly hold it in its normal or service position shown in FIGURE 2. In that position of the spool, the flanged end of the cylinder thereon may abut the bearing 50 on the front cover of the valve body to define the forward limit of motion of the spool.

In this normal position of the control spool, its intermediate land 54 is sealingly engaged with the wall of the bore 25 at a location axially intermediate the drain port 38 and the second tank port 40; the forward land 52 is sealingly engaged with the wall of the bore at an axial location which is intermediate the service port 39 and the front end of the bore; and the rear land 53 has sealing engagement with the wall of the bore at a location which is axially intermediate the drain port 38 and the main port 42 of the first tank passage.

Consequently, the two rearmost lands 53 and 54 cooperate to close off communication between the drain port 38 and the first and second tank ports 42 and 40, respectively, while the location of the rear land 53 allows source water from the rear inlet port 32 to flow into the first tank passage 35 through its port 42, for passage into the top of the water softener tank via duct 12. Since the two foremost lands 52 and 54 also cooperate to communicate the second tank port 40 with the service port 39, the source water entering the tank 5 flows downwardly therethrough and the soft water issuing from the bottom of the tank is returned to the second tank passage 36 of the valve via duct 13, from whence the softened water flows to the service passage 33 through the communicating ports 39 and 40.

The spool of the control valve is maintained in the position described until it becomes necessary to regenerate the bed of ion exchange material contained in the water softener tank. Regeneration, of course, involves flowing brine through the tank and the bed of ion exchange granules contained therein, so as to restore the ion exchange capacity of the bed.

Figure 3:
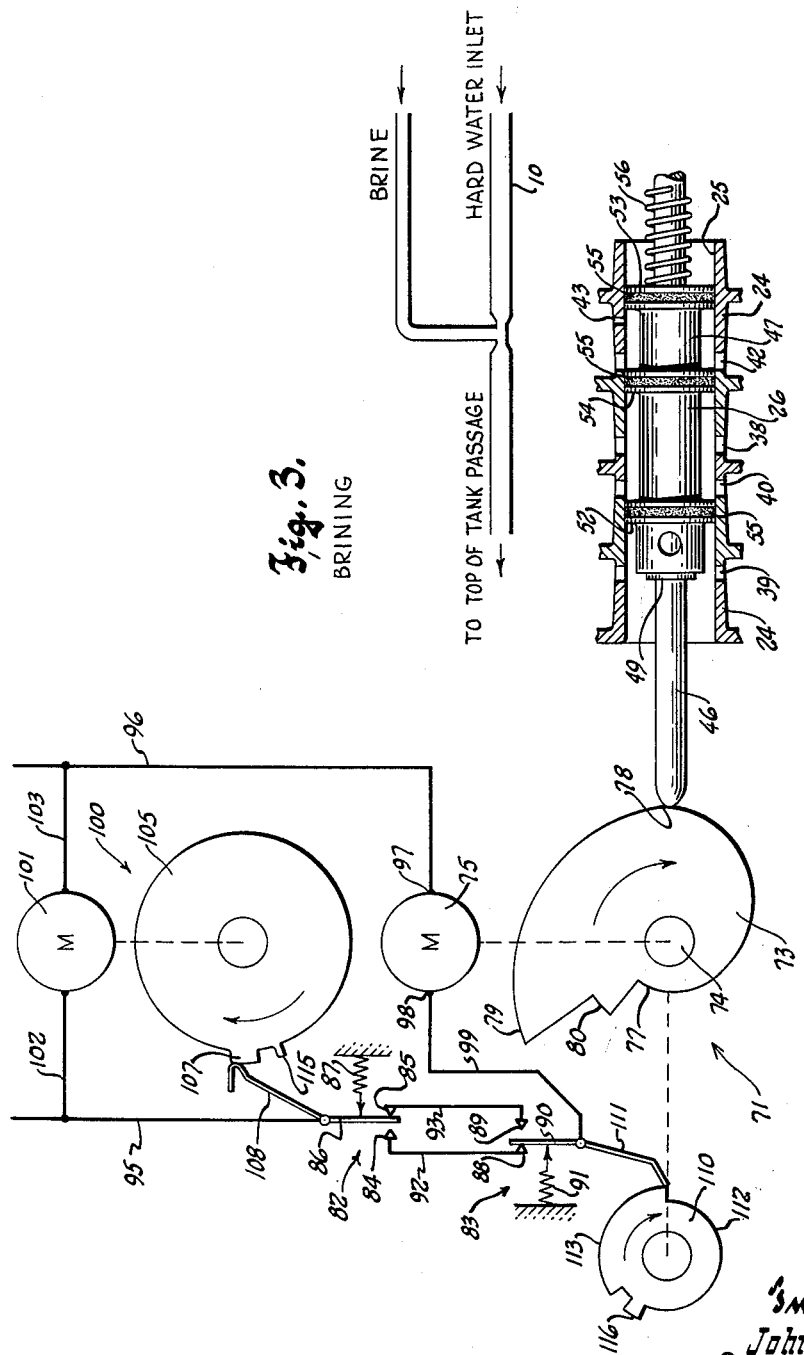
FIGURE 3 is a diagrammatic view of the valve and the actuating mechanism therefor, illustrating the control element of the valve shifted to a first regenerating position.

According to this invention, a regenerating cycle is initiated by moving the control spool of the distributor valve rearwardly to its position shown in FIGURE 3, to effect the brining step of the regenerating cycle. As will appear shortly, such shifting of the spool is effected automatically not only to the brining position of the spool shown in FIGURE 3, but also to its remaining positions necessary to carry out a complete regenerating cycle comprised of the successive steps of brining, backwashing, the desirable step of rinsing, and return of the spool to its service position.

As stated, the regenerating cycle is initiated by shifting the spool axially rearwardly in the valve body to the position shown in FIGURE 3. In this position of the spool, its lands 53 and 54 block off communication between the ports 42 and 43 for the first tank passage and the remaining ports of the valve; while the lands 52 and 54 cooperate to communicate the second tank port 40 with the drain port 38. This has the effect of venting the bottom flow port 8 of the softener tank to drain, making it possible to pass brine downwardly through the softener tank for the regeneration of the ion exchange material therein.

Also, with the control spool in the brining position described, the service port 39 is open to the forward water inlet port 31 so that fresh hard water is available to the service line, to which it is delivered in bypass relation to the water softener tank.

The brine necessary to effect regeneration of the ion exchange material is withdrawn from the brine tank 6 in a more or less conventional manner, through an eduction tube 57 which has its lower end connected with the brine outlet of a float controlled brine draw-off valve 58, and its upper end connected with the eduction port 59 of an injector mechanism 60. The injector mechanism has been shown mounted in the valve body with its inlet 61 in communication with the water inlet passage 30 and its outlet 62 arranged to debouche into the first tank passage 35, as seen best in FIGURE 6.

Except when the control spool is in the position shown in FIGURE 3, the injector mechanism 60 is maintained inoperative, due to the balance of fluid pressures in the water inlet passage 30 and in the first tank passage 35. However, in the regenerating position of the spool indicated in FIGURE 3, the venting of the softener tank causes the pressure in the first tank passage 35 to drop to that of the atmosphere, and since line pressure will obtain in the inlet passage 30, water from the inlet passage 30 is caused to flow forcefully through the injector mechanism and to debouche into the first tank passage 35, to create the eductive effect by which brine may be sucked into the injector and fed into the top of the softener tank.

In more or less conventional fashion, this eductive effect causes the poppet (not shown) in the brine valve 58 to be sucked open against the action of float 63, so that brine will be educted from the brine tank for downward passage through the bed of ion exchange material in the tank.

The brine effluent issuing from the bottom flow port 8 is led back into the second tank passage 36 of the control valve through the duct 13, and flows to drain by reason of the communication between the ports 38 and 40 which exists in the brining position of the control spool shown in FIGURE 3.

The rate at which brine may flow through the water softener tank is held to a substantially constant value by the incorporation of a flow regulating device 64 in the drain passage 34 of the control valve. It will be understood, however, that the device 64 may be located elsewhere as long as it does not interfere with the free flow of water through the system when it is in service operation.

During the eduction of brine from the brine tank in the manner described, the float 63 of the brine draw-off valve 58 slides downwardly on the stem 66 of the valve in consequence of lowering of the level of brine in the brine tank, and until a diaphragm or stopper 67 on the bottom of the float is sucked onto the brine inlet of the valve to terminate brine eduction. It is important to note that this occurs at a time while some brine remains at a level above the body of the brine draw-off valve 58, so as to assure against entry of air into the system during the brining step.

As soon as the inlet of the brine draw-off valve 58 is closed by the stopper 67 on the float of the valve, the next step in the regenerating cycle may be commenced, although it will be understood that preliminary rinsing can be effected if the control spool is left in its FIGURE 3 position for a period of time after the brine valve 58 has been closed by stopper 67.

According to this invention, the next step of the regenerating cycle is that of backwashing, during which fresh hard water is caused to flow upwardly through the water softener tank, and the backwash effluent issuing from the top of the tank is directed to the drain. To initiate backwashing, the spool of the control valve is shifted further rearwardly, from its position shown in FIGURE 3, to its position indicated in FIGURE 4. This communicates the water inlet port 31 with the second tank port 40, to cause source water to flow through duct 13 into the bottom of the softener tank. The lands on the spool now also cooperate to communicate the first tank port 42 with the drain port 38 so as to direct the backwash effluent issuing from the top of the tank to the drain line 15.

Since the backwash effluent must pass through the flow controlling device 64 in the drain passage 34, it will also be obvious that the rate at which backwashing water flows upwardly through the water softener tank is quite accurately controlled and regulated.

As soon as the control spool of the valve is shifted out of its regenerating position to the backwashing position shown in FIGURE 4, of course, the injector mechanism 60 in the control valve is rendered inoperative as a result of the balanced pressure conditions which thereafter exist in the water inlet passage 30 and in the first tank passage 35.

After all of the brine has been washed out of the water softener tank by the backwashing operation, the control spool of the valve may be returned to its service position or, optionally, it may be returned partway toward service but stopped at a rinsing position such as illustrated in FIGURE 5. At its rinsing position, the lands on the control spool cooperate to effect flow of source water downwardly through the softener tank and the bed of ion exchange material therein, so that such rinse water is softened by its passage through the ion exchange material and any hard water in the softener tank is expelled therefrom. Consequently, if the rinsing step is included in the regenerating cycle, fresh soft water will be available to the service lines immediately following the termination of regeneration.

Referring to FIGURE 5, which shows the control spool of the valve in the rinse position, it will be noted that the lands on the spool now communicate the second tank port 40 with the drain port 38, and communicate the first tank passage with the water inlet 32 through the auxiliary port 43. Again, in this case, as during the brining and backwashing steps, the service port 39 is in communication with the water inlet port 31, so that fresh hard water may be by passed directly to the service line during the entire regenerating cycle.

If the rinsing step just described is not needed in any particular installation, the auxiliary port 43 may be omitted from the control valve, but wherever rinsing is conducted it will be noted that the port 43 is somewhat smaller than the main port 42 for the first tank passage 35, to have a metering effect upon the flow of fresh rinse water into the top of the tank.

After a suitable relatively short period of time during which all of the hard water is purged from the water softener tank, rinsing may be concluded by returning the spool to its normal position shown in FIGURE 2. This, of course, terminates the regenerating cycle and again places the water softening system in service condition.

Those skilled in the art will appreciate that the step of backwashing following brining during the regenerating cycle constitutes a radical departure from the conventional. Heretofore, it was practically a universally recognized custom to initiate a regenerating cycle with a backwashing step, in the belief that silt, dirt and other foreign matter should be flushed from the bed of ion exchange material in the water softener tank before subjecting the bed to the action of brine.

Great advantages are achieved by a regenerating cycle in which washing follows brining. Briefly stated, it has now been found that the tiny beads of synthetic resin of which the bed of ion exchange material is comprised, are caused to shrink by as much as 12% when they are subjected to brine. This shrinkage can and does loosen ion oxide scale from the beads and, according to this invention, such flaked off scale is removed from the bed of ion exchange material along with flocculated iron particles therein by backwashing following brining of the ion exchange material, provided the mouth 69 of the duct 12 is unobstructed by the usual screen, and provided there is a freeboard in the water softener tank equal to at least 50% of the depth of the bed of ion exchange granules.

Backwashing, of course, must be conducted at a rate which is so regulated by the flow controlling device 64 as to cause expansion and lifting of the granules comprising the bed to a point within a few inches of the mouth 69 of the duct 12, so as to completely separate the individual granules and allow dirt, silt, flakes or iron oxide which have been caused to detach themselves from the beads of ion exchange material during brining, and iron oxide floc in the bed to be readily flushed out of the top flow port 7 for flow to the drain line 15.

The step of backwashing following brining is extremely important and highly advantageous in areas where iron in the water has heretofore presented the serious problem of fouling of the bed of ion exchange material by iron oxide, and particularly encapsulation of the little beads of synthetic ion exchange resin with iron oxide scale.

According to this invention, an automatic operator 71 is provided to actuate the control spool of the valve and to assure that regeneration will always be carried out as described above, and in a way which cannot be interfered with intentionally or unintentionally by an operator or owner of the water softener apparatus, as is the case with control valves of the manual or semi-automatic type heretofore available.

The automatic operator comprises a rotatable actuator 73, which may be mounted on the shaft 74 of an electric motor 75 so as to be driven by the motor. The actuator is in the form of a cam, the periphery of which is engaged by the forwardly projecting end of the stem 46 of the control spool, so that the cam has a motion-transmitting connection with the spool.

The cam 73 is constrained to rotate on an axis which is normal to the axis of the spool, and the forwardly projecting end of the stem 46 is normally held in engagement with the shortest radius peripheral portion or station 77 of the cam by means of the return spring 56 acting upon the spool. The cam is driven in a clockwise direction, as indicated by the arrow delineated thereon, and for nearly 360° of rotation, starting with the station 77 on the cam, its periphery follows a spiral which more or less constantly increases in radius past what might be termed a "brining station" 78, located approximately 180° opposite the station 77 and to what can be considered a "backwashing station" 79 where the periphery of the cam has the greatest radius. Thereafter, the cam drops off abruptly from its station 79 to what can be considered a "rinsing station" 80 on its periphery, disposed radially intermediate the shortest radius station 77 and the station 79 of maximum radius. Through only a few degrees, the periphery of the cam drops off abruptly from the station 80 to station 77.

The throw of the cam is such that upon clockwise rotation thereof through an angle of about 180° from its position seen in FIGURE 2, its station 78 is brought into register with the forward end of the stem 46 of the control spool, to effect shifting of the spool axially rearwardly from its service position to its brining position shown in FIGURE 3. Continued rotation of the cam through an angle of about 90° to bring its station 79 into register with the stem 46 of the spool, effects shifting of the spool axially rearwardly beyond its brining position to its backwashing position seen in FIGURE 4.

Thereafter, only slight rotation of the cam in the clockwise direction causes the stem 46 of the control spool to drop off abruptly from the backwashing station and effects return axial motion of the spool to the rinsing position thereof at which the stem 46 on the spool engages the station 80 of the cam. During the remainder of the cycle of cam rotation, only a few degrees, the stem 46 of the spool abruptly drops off of the station 80 and reengages the station 7, thus effecting return of the spool to its service position.

Energization of the electric motor 75 is effected through a pair of single pole, double throw switches 82 and 83. The switch 82 may be said to constitute a motor starting switch, and it has a pair of stationary contacts 84 and 85 and a movable contactor 86 cooperable therewith, but biased by a spring 87 into engagement with the contact 84.

The switch 83 may be said to be a motor de-energizing switch, and it also has a pair of stationary contacts 88 and 89, and a movable contactor 90 cooperable therewith, but biased into engagement with the contact 89 by a spring 91.

The stationary contact 84 of the switch 82 is connected with the contact 88 of the switch 83 by means of a conductor 92, and the contact 85 of the switch 82 is connected with the contact 89 of the switch 83 by means of a conductor 93. Consequently, the biasing springs 87 and 91 for the two switches tend to maintain the contactors thereof in positions at which the electric motor 75 is de-energized.

The motor 75 may be energized to impart rotation to the cam 73 when the contactor of the switch 82 is swung to its opposite position, disengaged from the stationary contact 84 and in engagement with the contact 85. This connects the motor with supply lines 95 and 96, the former being connected with the movable contactor 86 of switch 82 and the latter being connected with one of the terminals 97 of the electric motor. The other terminal 98 of the electric motor is connected by a conductor 99 with the movable contactor 90 of the switch 83.

The motor starting switch 82 is actuated at the dictation of a calendar clock mechanism generally designated 100. Such mechanisms are well known, and it will here suffice merely to point out that the mechanism comprises a Telechron type motor 101 connected across the supply lines 95 and 96 by means of conductors 102 and 103 so as to run continuously. The Telechron motor is shown as driving a switch actuating cam 105, and those skilled in the art will appreciate that this cam ordinarily comprises a portion of an adjustable mechanism which may be set to initiate regeneration either daily, on alternate days, or on any preselected days of the week. It has here been shown by way of example as being rotatable through one complete revolution over a period of twenty-four hours.

At some predetermined time, as for instance in the very early morning hours when there is little or no demand for soft water, a projection 107 on the periphery of the starting cam 105 is carried into engagement with an arm 108 on the movable contactor of switch 82 to move the contactor 86 out of engagement with its contact 84 and to bring it into engagement with the other stationary contact 85 of the switch. This initiates a regenerating cycle of operation of the water softening apparatus. Eengagement of the stationary contact 85 by the contactor 86 of the switch 82 completes an energizing circuit for the electric motor 75, to start the actuator cam 73 rotating in the clockwise direction to effect shifting of the control spool rearwardly to its brining position seen in FIGURE 3. When the spool reaches that position, the energizing circuit to the motor 75 is broken to stop rotation of the actuating cam at a point in its cycle at which the forwardly projecting end of the stem 46 of the control spool is in engagement with the station 78 of the cam.

Such de-energization of the motor is effected by means of a motor de-energizing cam 110, which is connected to the actuating cam 73 to rotate therewith. For this purpose, the contactor 90 of the switch 83 has an arm 111 thereon which normally engages a concentric peripheral portion 112 on the cam 110, but which arm is contacted by a circumferentially elongated projection 113 on the cam to trip the motor de-energizing switch 83 when the actuating cam 73 has rotated approximately 180° to bring the station 78 on its periphery into engagement with the stem 46 of the control spool. Consequently, the actuating cam 73 stops rotating when the spool reaches the brining position shown in FIGURE 3, by reason of the fact that the contactor 90 of the motor de-energizing switch 83 will then be disengaged from contact 89 and in engagement with the stationary contact 88. At this time, of course, the contactor 86 of the motor starting switch 82 will be engaged wih the stationary contact 85, as shown in FIGURE 3.

The motor de-energizing cam 110, of course, stops rotating as soon as the actuating cam 73 does, in the position thereof shown in FIGURE 3, at which time the arm 111 on the contactor of the switch 83 has just engaged upon the circumferentially elongated projection 113 of the cam.

Actuation of the control spool of the valve to its position seen in FIGURE 3 in the manner described, initiates the regenerating cycle of operation, and commences the step of brining. The brining step continues for a period of time determined by the arcuate length of the projection 107 on the motor energizing cam 105. When the cam 105 has rotated far enough, the arm 108 on the contactor 86 of the motor energizing switch 82 rides off of the projection 107 and the spring 87 acting upon the contactor snaps it into engagement with the stationary contact 84, as shown in FIGURE 4. Bearing in mind that the contactor 90 of the motor de-energizing switch 88 is in engagement with the stationary contact 88 of the switch at this time, it will be apparent that the motor energizing circuit is again completed, and the motor imparts further rotation in the clockwise direction to the actuating cam 73 and the motor de-energizing cam 110.

Such rotation continues until the actuating cam 73 has shifted the control spool to its rearmost position shown in FIGURE 4, to start the backwashing step of the regenerating cycle. At this time, further rotation of cams 73 and 112 is stopped in consequence of the arm 111 of switch 83 dropping off of the circumferentially elongated projection 113 on cam 110, as indicated in FIGURE 4, to enable the return spring 91 to disengage the contactor from the contact 88 and to re-engage it with the stationary contact 89.

Consequently, with the electric motor 75 de-energized, the control spool will remain in the backwashing position for the period of time it takes for rotation of the motor energizing cam 105 to engage a smaller projection 115 on its periphery with the contactor arm 108 of switch 82. This effects disengagement of the contactor 86 from stationary contact 84 and re-engagement of the contactor with stationary contact 85, to again complete the energizing circuit for the motor 75.

As a result, the actuating cam 73 is rotated the short distance necessary to carry its station 79 past the forwardly projecting end of the stem 46 of the control spool and to bring its station 80 into register with the stem. Hence, the return spring 56 moves the spool forwardly to its rinsing position shown in FIGURE 5.

When the actuating cam reaches this position of rotation, the motor de-energization cam 110 will have been brought into a position at which a short projection 116 on its periphery engages the arm 111 of the contactor 90 to cause separation thereof from its stationary contact 89 and re-engagement of the contactor with its stationary contact 88. De-energization of the electric motor 75 is thus effected, since contactor 86 of switch 82 is then in engagement with contact 85.

Shifting of the control spool to its position seen in FIGURE 5, initiates the rinsing step of the regenerating cycle, which is of rather short duration and is terminated as soon as the smaller projection 115 on the motor energizing cam 105 rotates past the arm 108 on the contactor of motor energizing switch 82. The return spring then acts upon the contactor 86 to disengage it from the stationary contact 85 and re-engage it with the contact 84.

Since at this time the contactor 90 of the switch 83 is in engagement with the stationary contact 88 of the switch 83, the energizing circuit for the electric motor will again be established to cause the actuating cam 73 to rotate the short angular distance necessary to carry station 80 on the cam past the forward end of the stem 46 of the control spool, and to realign the service station 77 on the cam with the stem of the spool. Return spring 56 thus operates to shift the spool forwardly to its service position.

When this occurs, the rotation of the motor de-energizing cam 112 has progressed to the point where its circumferentially short projection 116 has been rotated past the arm 111 on the contactor of the switch 83, to allow the spring 91 to separate the contactor 90 from stationary contact 88 and re-engage it with stationary contact 89 to break the energizing circuit for the electric motor 75. Thus, rotation of the actuating cam 73 and the de-energizing cam 112 is stopped at the positions thereof shown in FIGURE 2, and the control spool will remain in its service position therein shown until the projection 107 on the motor energizing cam 105 again comes in contact with the arm 108 on the contactor of the motor energizing switch 82 on the following day.

In the embodiment of the invention illustrated in FIGURE 7, the control spool is positively shifted back and forth in its bore to the various operating positions thereof, by means of a box cam actuator 73' which, with the exceptions to be discussed hereinafter, is the full functional equivalent of the actuating cam 73 described previously.

When a box cam is employed to shift the spool, the forwardly projecting end of the stem 46' on the valve spool has a cam follower roller 118 freely rotatably mounted thereon and engaging in an endless cam track 119 in one face of the cam, so that the latter can both push the spool rearwardly and move it forwardly in its bore as the cam rotates. Obviously, in this case, the biasing or return spring of the previous embodiment of the invention may be eliminated from the control valve.

The stations 77', 78', 79' and 80' on the actuating cam 73' are arranged slightly differently than those on the cam 73, being located at approximately 90° intervals along the cam track 119. Hence, the stations 77' and 79' are substantially diametrically opposite one another, while the stations 78' and 80' are likewise at directly opposite sides of the track.

Also, in this embodiment of the invention, indentations 107' and 115' are provided in the motor energizing cam 105' rather than projections, and, similarly, indentations 113' and 116' are provided in the motor de-energizing cam 110' to perform the same functions as the projections motor de-energizing cam 110', however, has its indentations 113' and 116' of equal arcuate length and diametrically opposite one another, to match the angular spacing of the stations 77', 78', 79' and 80' on the actuating cam 73'.

The automatic control mechanism shown in FIGURE 7 functions in exactly the same way as that previously described. It normally maintains the control spool in its service position, until a regenerating cycle of predetermined duration is initiated by the motor energizing cam 105'. Thereafter, the control spool is automatically shifted rearwardly to its brining position and held there for a predetermined interval, then shifted farther rearwardly to its backwashing position and held there for another predetermined interval. Thereafter, the cam 73' positively returns the spool first to its rinsing position, and after a short rinsing period, to its service position to terminate the regenerating cycle.

From the foregoing description, taken together with the accompanying drawings, it will be readily apparent to those skilled in the art that this invention provides an improved water softening system, which is governed by a fully automatic control valve to assure that regeneration of the ion exchange material in the tank of the softening system will aways be carried out in exactly the same advantageous manner.

What is claimed as my invention is:

A control instrumentality for a water softener comprising:

A. a valve connectable with a water softening tank containing ion exchange material, and having a valve element movable to a normal service position and successively to each of three regenerating positions at which the valve effects, in a predetermined sequence, such regenerating operations as brining, backwashing and purging in the direction of service flow of water through the tank;

B. a rotatable actuator having a motion transmitting connection with the valve element, for constraining the valve element to move out of its service position, to each of its regenerating positions in a predetermined sequence, and back to its service position during each rotation of the actuator;

C. an electric actuator motor drivingly connected with said actuator;

D. a pair of electric switches, each of the type having a movable contactor engageable with either of a pair of fixed contacts;

E. cam-follower means for each of said switches, each having a motion transmitting connection with the movable contactor of its switch;

F. means providing an energizing circuit for connecting the actuator motor with a current source, said circuit including the two switches, with each of the fixed contacts of one switch connected with a corresponding fixed contact of the other so that the energizing circuit is completed only when the movable contactors of the two switches engage connected fixed contacts;

G. a continuously driven rotating timing mechanism;

H. a first cam driven by the timing mechanism to rotate in unison therewith and cooperating with the cam follower means of one of said switches, said first cam having two lobes which successively engage with and disengage from said cam follower means during each rotation of the first cam and each of which lobes by its engagement with the cam follower means effects movement of the movable contactor of said one switch into engagement with one of its fixed contacts and by its disengagement from the cam follower means effects movement of said movable contactor into engagement with the other of its fixed contacts, each of said engagements of the movable contactor with a fixed contact being adapted to complete the energizing circuit and thereby effect shifting of the valve element from one of its positions to the other; and I. a second cam driven by the actuator motor for rotation in unison with the actuator and cooperating with the cam follower means of the other switch, said second cam having two lobes which successively engage with and disengage from said cam follower means during each rotation of the second cam and each of which lobes by its engagement with the cam follower means effects movement of the movable contactor of said other switch into engagement with one of its fixed contacts, and by its disengagement from the cam follower means effects movement of said movable contactor into engagement with the other of its fixed contacts, each of said movements of the movable contactor effecting deenergization of the actuating motor when the valve element arrives at a predetermined position, to maintain the valve element in such position, and preparing the energizing circuit for completion when the first cam effects the next succeeding movement of the movable contactor of the first designated switch.

References Cited in the file of this patent
UNITED STATES PATENTS

| | | |
|---|---|---|
| 2,722,514 | Sloan | Nov. 1, 1955 |
| 2,739,119 | Stoner | Mar. 20, 1956 |
| 2,825,359 | Williams | Mar. 4, 1958 |
| 2,906,332 | Rosten et al. | Sept. 29, 1959 |
| 2,989,988 | Rudelick | June 27, 1961 |